United States Patent
Galonska et al.

(10) Patent No.: US 10,290,952 B2
(45) Date of Patent: May 14, 2019

(54) SOLDERING ON THIN GLASS SHEETS

(75) Inventors: Steffen Galonska, Wesel (DE); Matthias Kriegel-Gemmecke, Wesel (DE)

(73) Assignee: PILKINGTON GROUP LIMITED, Nr. Ormskirk, Lancashire (GB)

( * ) Notice: Subject to any disclaimer, the term of this patent is extended or adjusted under 35 U.S.C. 154(b) by 420 days.

(21) Appl. No.: 13/695,994

(22) PCT Filed: May 3, 2011

(86) PCT No.: PCT/GB2011/050865
§ 371 (c)(1),
(2), (4) Date: Nov. 16, 2012

(87) PCT Pub. No.: WO2011/138600
PCT Pub. Date: Nov. 10, 2011

(65) Prior Publication Data
US 2013/0062120 A1 Mar. 14, 2013

(30) Foreign Application Priority Data
May 4, 2010 (GB) .................................. 1007346.8

(51) Int. Cl.
*H01R 4/02* (2006.01)
*B32B 17/10* (2006.01)
(Continued)

(52) U.S. Cl.
CPC ............. *H01R 4/02* (2013.01); *B23K 1/0016* (2013.01); *B32B 17/10036* (2013.01);
(Continued)

(58) Field of Classification Search
CPC ............... H05K 3/0061; H05K 3/3452; H05K 2201/0367; H05K 2201/10287;
(Continued)

(56) References Cited

U.S. PATENT DOCUMENTS 3,207,838 A 9/1965 McCormack
3,623,906 A 11/1971 Akeyoshi et al.
(Continued)

FOREIGN PATENT DOCUMENTS

EP 0 677 491 A2 10/1995
EP 1 215 039 A2 6/2002
(Continued)

OTHER PUBLICATIONS

International Search Report (PCT/ISA/210) dated Sep. 5, 2011, by the British Patent Office as the International Searching Authority for International Application No. PCT/GB2011/050865.
(Continued)

*Primary Examiner* — Steven T Sawyer
*Assistant Examiner* — Paresh H Paghadal
(74) *Attorney, Agent, or Firm* — Buchanan Ingersoll & Rooney PC

(57) ABSTRACT

A process is disclosed, whereby soldered connections to electrical conductors incorporated on thin glass are achieved. Sufficient resistance to cracking is obtained by virtue of surface stresses induced locally in a region where soldering is to be done. In a preferred embodiment, surface stresses imparted during a press bending operation are relied upon.

8 Claims, 2 Drawing Sheets

(51) Int. Cl.
*C03B 23/03* (2006.01)
*C03B 27/04* (2006.01)
*C03C 8/18* (2006.01)
*H05B 3/84* (2006.01)
*B23K 1/00* (2006.01)

(52) U.S. Cl.
CPC .. *B32B 17/10091* (2013.01); *B32B 17/10761* (2013.01); *C03B 23/0307* (2013.01); *C03B 27/0413* (2013.01); *C03C 8/18* (2013.01); *H05B 3/84* (2013.01); *H05B 2203/016* (2013.01); *H05B 2203/017* (2013.01)

(58) Field of Classification Search
CPC ..... H01L 2924/1078; H01L 2924/1079; H01L 2924/3011; B32B 17/1022; B32B 17/10376; B32B 17/10431; H01R 4/02; B32K 1/0016; C03B 23/0307; C03B 27/0413; H05B 2203/016; H05B 2203/017
USPC ....... 174/250, 251, 254, 257, 259, 261, 267, 174/84 R
See application file for complete search history.

(56) References Cited

U.S. PATENT DOCUMENTS

| | | | |
|---|---|---|---|
| 3,960,535 A | 6/1976 | Hamilton et al. | |
| 4,075,381 A | 2/1978 | Furukawa et al. | |
| 4,283,440 A * | 8/1981 | Paudice et al. | 427/108 |
| 4,388,522 A * | 6/1983 | Boaz | 219/522 |
| 4,508,783 A | 4/1985 | Aubry et al. | |
| 4,910,380 A * | 3/1990 | Reiss | B32B 17/10036 15/250.05 |
| 5,252,140 A * | 10/1993 | Kobayashi | H01L 31/022466 136/256 |
| 5,867,128 A * | 2/1999 | Sauer | 343/713 |
| 6,320,276 B1 * | 11/2001 | Sauer | B32B 17/10036 307/10.1 |
| 6,403,147 B1 * | 6/2002 | McCurdy | C03C 17/3417 427/126.2 |
| 7,134,201 B2 * | 11/2006 | Ackerman et al. | 29/857 |
| 2002/0106519 A1 * | 8/2002 | Takahara | 428/426 |
| 2003/0034172 A1 * | 2/2003 | Alpen | H01Q 1/1278 174/149 R |
| 2003/0146199 A1 * | 8/2003 | Sol | B32B 17/10036 219/203 |
| 2004/0098946 A1 * | 5/2004 | Meerman | 52/786.12 |
| 2005/0112291 A1 * | 5/2005 | Okajima et al. | 427/447 |
| 2005/0266247 A1 * | 12/2005 | Yoshizawa | B32B 17/10036 428/410 |
| 2006/0126196 A1 | 6/2006 | Crumbach et al. | |
| 2007/0128448 A1 | 6/2007 | Saimi | |
| 2007/0210621 A1 * | 9/2007 | Barton et al. | 296/215 |
| 2008/0164248 A1 * | 7/2008 | Reul | B23K 1/002 219/617 |
| 2009/0033123 A1 * | 2/2009 | Torr | B60S 1/0822 296/96.19 |
| 2009/0128431 A1 * | 5/2009 | Martin | B32B 17/10036 343/713 |
| 2009/0233119 A1 * | 9/2009 | Lyon | B32B 17/10174 428/598 |
| 2010/0212959 A1 * | 8/2010 | Flick | B32B 17/10036 174/84 R |
| 2012/0152930 A1 * | 6/2012 | Chamberlain | H05B 3/84 219/203 |

FOREIGN PATENT DOCUMENTS

| | | |
|---|---|---|
| GB | 1009954 A | 11/1965 |
| GB | 1194090 A | 6/1970 |
| GB | 2 449 174 A | 11/2008 |
| JP | S51-54607 A | 5/1976 |
| JP | S52-78226 A | 7/1977 |
| JP | S59-18122 A | 1/1984 |
| JP | 2006-282982 A | 10/2006 |
| JP | 2010-070414 A | 4/2010 |
| WO | WO 02/07967 A1 | 1/2002 |
| WO | 2006/016588 A1 | 2/2006 |
| WO | 2006/132319 A1 | 12/2006 |

OTHER PUBLICATIONS

Search Report dated Sep. 3, 2010, issued by the United Kingdom Patent Office in the corresponding United Kingdom Patent Application No. GB1007346.8. (1 page).

* cited by examiner

SOLDERING ON THIN GLASS SHEETS

The invention concerns a process for soldering electrical connections to circuits incorporated on thin sheets of glass. The invention also concerns glass incorporating such circuits and connections and products such as glazing assemblies which incorporate such glass.

The need for techniques to form electrical connections with circuits incorporated on glass substrates is widespread. For example glazings for buildings or vehicles commonly include any of a variety of electrical circuits serving as (e.g.) antennas or heating elements. Such circuits may be realised as a printed conductive ink to which connections to other equipment such as radio equipment, telephony equipment or power supplies must be made.

The electrical connections can be made by soldering electrical connectors to the printed ink but a number of problems are known.

In particular, the soldered connections are susceptible to failure due to stress-induced cracking of the glass. This failure arises from the heat applied during soldering. As a general rule, it can be said that the thinner the glass substrate, the greater the likelihood of such failure.

Printing of electrical circuits such as heating and antenna applications, with a variety of soldered connectors, is known on glass substrates as thin as 2.1 mm which form the inner sheet of a laminated glazing. The connector soldering is a critical step in the fabrication of such glazings, and may require special connector design in order to achieve a stable product. The provision of reliable soldered connections to conductors incorporated in sheets of less than 2.1 mm has hitherto proved to be difficult.

Nevertheless there is an increasing demand for savings (in terms of weight and cost) to be achieved by the use of thinner laminated materials. At the same time the number of electrical applications which require the incorporation of electric circuits with connectors on glazings is increasing continuously. For example, wiper rest area heating, camera area heating and antennas are becoming standard features of modern motor vehicles.

It is well known that glass can be toughened by a tempering process whereby it is heated and then rapidly cooled to induce a state of compressive stress in its surface. The advantages of such toughened glass are that it is less susceptible to cracking, less likely to break and, when it does break, it shatters to form many small fragments rather than larger, more dangerous, shards. Fully tempered glass typically has a surface stress of greater than 65-69 MPa although the term "Heat Strengthened Glass" is sometimes used to describe glass having a surface stress of between 40 and 55 MPa.

"Semi-toughened" glass having a surface stress of 20-25 MPa may be produced by furnace heating followed by suitable controlled cooling. Such glass is a common choice of material for laminated door glazings.

(Toughening may also be achieved by a chemical process of ion exchange whereby smaller ions in the surface region of the glass are replaced with larger ions, forcing the surface of the glass into a state of compression).

Laminated glass typically offers an alternative approach to improving the safety of glazing material. Two, or more, layers of glass are bonded together by an interlayer of polymer material such as polyvinyl butyral (PVB). When the glass is broken, the PVB keeps the glass fragments together, thus reducing the risk of injury to personnel.

A process whereby reliable soldered connections may be made on thin glazing material, particularly laminated glazings, with minimal change to existing manufacturing processes would represent a significant advance in the art.

The use of so-called obscuration bands in vehicle glazings is common practice. Typically, an area around the periphery of the glazing is rendered opaque by printing a coating of a dark ceramic ink. In a laminated glazing, comprising an outer (nearest the outside of the vehicle) layer of glass, an inner layer of glass and a polymer interlayer disposed therebetween, the obscuration band is typically printed on the inner surface of the outer layer of glass and/or the inner surface of the inner layer of glass.

One benefit of the obscuration band is that various ancillaries on the glazing such as printed busbars, connectors etc. can be located in this area and remain invisible from the outside of the vehicle. This provides for a more aesthetically pleasing effect.

Shaped glazings, for example vehicle windscreens, are normally formed by one of two approaches.

In the first, so called sag bending approach, a glass sheet is supported at its periphery and heated until it softens sufficiently to sag under its own weight to the desired shape. Control is achieved via the distribution of temperatures across the glass.

In an alternative approach to shaping of glazings, the technique of press bending is employed.

Typically, by this method the glazing sheets are subjected to controlled heating in a furnace to a temperature at which the glass is deformable. The heated glass is then conveyed from the furnace to a bending station where it is pressed between male and female dies which cooperate to form the sheet in the desired shape.

One or both of the dies may include additional heating means such as electrical resistive heating elements.

The shape of the pressed sheet must be maintained during subsequent cooling.

EP0677491 discloses a method of press bending. This publication also discloses differential heating across the glass, for example by use of resistive heaters incorporated in one of the dies. These may be controlled as one or as a number of separate groups giving rise to zones of different temperature in the sheet.

Press bending offers a high precision technique which lends itself well to the matching inner and outer plies of glass in a laminated glazing.

According to the invention, a method of forming a soldered connection to a first electrical conductor formed on a glass substrate, said substrate having a thickness of less than 2.1 mm, comprises the steps set out in claim 1 attached hereto.

In preferred embodiments, the surface stress of the substrate is less than 25 Mpa, more preferably less than 20 MPa, even more preferably less than 15 MPa.

Most preferably, the surface stress is greater than 12 MPa.

In a preferred embodiment, the method further comprises the steps of:

heating the glass sheet in a furnace to a temperature sufficient to facilitate bending;

conveying the sheet from the furnace to a press bending station;

shaping the sheet by pressing it between opposed complementary shaping surfaces provided on upper and lower press members;

inducing the surface stress in the glass sheet by quenching the surfaces of the glass.

Surface stress may be increased locally, in a region where soldering is to be done, by differential heating of the glass sheet prior to subsequent cooling. Such differential heating may be achieved using a plurality of heating elements incorporated in one of the press members. Alternatively, stresses may be increased locally by more rapid cooling (quenching) of the region, relative to the rest of the sheet.

In a preferred embodiment, an opaque coating is applied to a region of the glass sheet, the coating including a gap where the surface of the glass is exposed. Printing of the electrical conductor is done in said gap.

Preferably, the soldered connection is formed on a glass sheet having a thickness of less than or equal to 1.6 mm, more preferably less than or equal to 1 mm.

Preferably, the glazing further comprises an opaque coating on a region of said first glass sheet, said coating including a gap where the surface of the glass sheet is exposed and where said first electrical conductor is printed.

The glazing might include a second glass sheet and a polymer interlayer disposed between the first and second glass sheets.

Preferably, the first glass sheet has a surface stress of less than 25 MPa, more preferably less than 20 MPa, even more preferably less than 15 MPa.

Most preferably, the first glass sheet has a surface stress of greater than 12 MPa.

Preferably, the first glass sheet has a thickness of less than or equal to 1.6 mm, more preferably less than or equal to 1 mm.

The invention arises from the discovery that glazings processed by the applicant's Advanced Press Bending Process are endowed with a certain level of residual surface stress. According to this process, the glass sheets are heated in a furnace until they are deformable and then shaped by pressing between cooperating male and female dies. After pressing, the sheets are transported from the dies and cooling takes place.

This stress arises from the associated thermal cycle, whereby the glazing is heated sufficiently to allow press bending and then allowed to cool at a rate sufficient to impart the surface stress.

While the surface stresses arising from this process may not be as great as typically observed in fully toughened glass, or even so called "heat strengthened glass", the applicant has found that they are sufficient to allow a satisfactory soldered connection to be made to conductors printed on sheets as thin as 1 mm.

Hence the invention represents an augmentation of existing technology; can be implemented with minimal disruption of existing processes and provides an easy route to a product that was hitherto difficult or impossible to achieve, namely a laminated glazing formed from thin sheets of glazing material and having robust soldered connections to circuits included thereon.

The invention will now be described by non-limiting example, with reference to the following figures in which.

Table 1 shows measured surface stress values obtained on a total of 15 samples of glass sheets following processing according to Pilkington Group advanced press bending process.

The measurements were done using a GASP® surface stress meter on the outer surface (surface 1) of the non laminated pair of glass.

Figure 1:
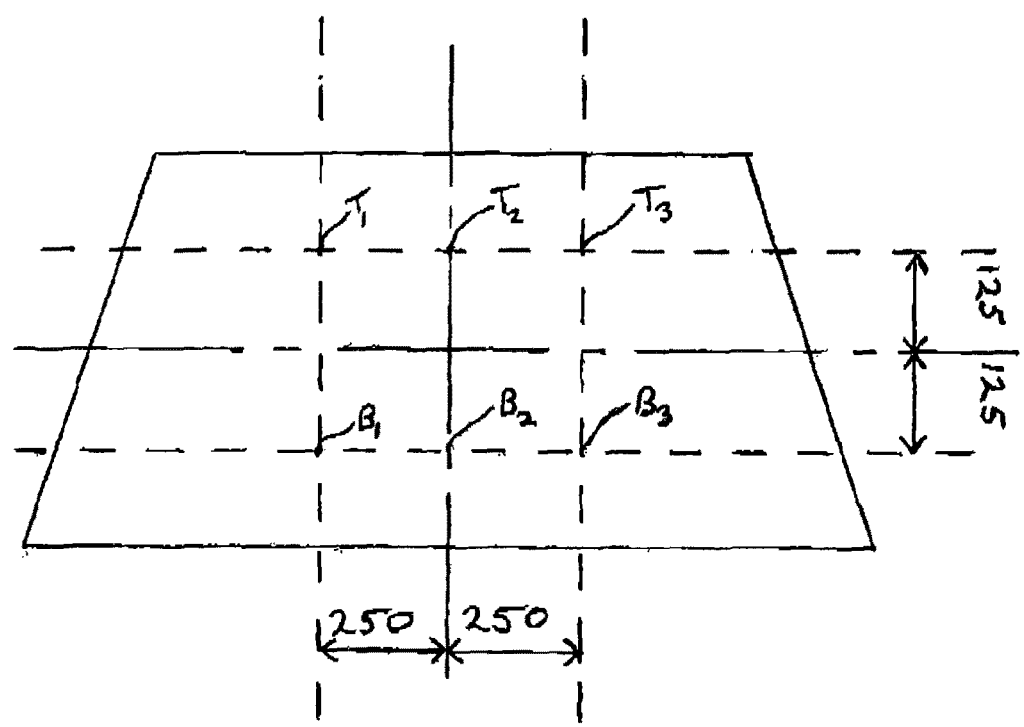
FIG. 1 illustrates the positions on vehicle glazings at which surface stress measurements were made, in order to assess the effect on surface stress of a typical press bending process.

Each pair of glasses was taped to avoid sliding during measurement and was positioned on an airbag for measuring. The positions for surface stress measurement were selected according to positions used in a former stone impact test (S/TN2001/02) and are labelled $T_1$-$T_3$ and $B_1$-$B_3$ in FIG. 1 (dimensions are in mm).

At each position stress measurements were done perpendicular (p) and parallel (n) to bottom edge.

The data presented in table 1 shows that surface stress in the glass samples wore typically in the range from 12 to 15 MPa although values as low as about 8 MPa and as high as 18.4 MPa are recorded.

The inventors have also observed that semi-toughened glass having a surface stress of about 20 MPa to 25 MPa performs as well as fully toughened glass in terms of the reliability of soldered connections to circuits printed on the glass.

TABLE 1

| | | Surface stress in MPa (all stresses are compressive surface stresses on outer glass) Sample No. | | | | | | | | | | | | | | |
|---|---|---|---|---|---|---|---|---|---|---|---|---|---|---|---|---|
| measurement | | 1 | 2 | 3 | 4 | 5 | 6 | 7 | 8 | 9 | 10 | 11 | 12 | 13 | 14 | 15 |
| Position | | Thickness (outer/inner) | | | | | | | | | | | | | | |
| on glass | direction | 2.1 gr/1.6 cl | | | 1.8 cl/1.8 cl | | | 2.1 gr/2.1 cl | | | 2.1 gr/1.8 cl | | | 1.8 gr/1.8 gr | | |
| T1 | n | −15.1 | −15.8 | −17.8 | −14.9 | −14.5 | −12.8 | −14.4 | −14.9 | −14.2 | −17.0 | −14.4 | −14.5 | −14.2 | −13.3 | −11.7 |
| | p | −18.4 | −13.7 | −16.2 | −11.2 | −11.6 | −11.7 | −14.2 | −13.5 | −13.7 | −15.4 | −16.2 | −14.2 | −13.7 | −12.4 | −10.6 |
| T2 | n | −15.1 | −16.4 | −17.6 | −13.5 | −12.8 | −13.2 | −14.7 | −15.8 | −15.3 | −14.0 | −14.7 | −15.6 | −13.2 | −12.3 | −12.5 |
| | p | −15.3 | −15.3 | −12.5 | −11.9 | −9.6 | −9.9 | −14.0 | −14.9 | −16.2 | −13.8 | −13.0 | −14.0 | −12.0 | −12.3 | −11.4 |
| T3 | n | −16.6 | −15.3 | −17.4 | −12.5 | −13.5 | −14.4 | −15.3 | −14.2 | −14.4 | −16.6 | −13.8 | −13.1 | −13.8 | −13.2 | −13.5 |
| | p | −17.8 | −13.7 | −13.3 | −11.6 | −12.7 | −13.3 | −15.8 | −14.2 | −13.8 | −15.3 | −12.8 | −14.9 | −12.3 | −13.0 | −11.7 |
| B1 | n | −14.9 | −16.2 | −15.9 | −11.6 | −13.7 | −12.0 | −13.2 | −15.4 | −15.3 | −13.0 | −16.6 | −17.0 | −13.3 | −14.5 | −12.2 |
| | p | −14.5 | −16.4 | −14.0 | −10.5 | −11.1 | −10.1 | −14.0 | −13.7 | −12.8 | −13.7 | −12.7 | −16.0 | −11.9 | −12.3 | −11.2 |
| B2 | n | −13.7 | −13.8 | −17.4 | −12.0 | −13.3 | −12.5 | −14.4 | −15.1 | −14.5 | −14.2 | −15.8 | −16.7 | −12.8 | −12.8 | −13.0 |
| | p | −15.2 | −13.2 | −13.0 | −9.2 | −10.3 | −9.3 | −13.0 | −14.0 | −14.9 | −14.9 | −14.7 | −14.5 | −12.2 | −10.0 | −11.1 |

TABLE 1-continued

| | | Surface stress in MPa (all stresses are compressive surface stresses on outer glass) Sample No. | | | | | | | | | | | | | | |
|---|---|---|---|---|---|---|---|---|---|---|---|---|---|---|---|---|
| measurement | | 1 | 2 | 3 | 4 | 5 | 6 | 7 | 8 | 9 | 10 | 11 | 12 | 13 | 14 | 15 |
| Position | | Thickness (outer/inner) | | | | | | | | | | | | | | |
| on glass | direction | 2.1 gr/1.6 cl | | | 1.8 cl/1.8 cl | | | 2.1 gr/2.1 cl | | | 2.1 gr/1.8 cl | | | 1.8 gr/1.8 gr | | |
| B3 | n | −14.5 | −15.1 | −17.2 | −14.2 | −14.2 | −12.7 | −16.2 | −17.6 | −15.2 | −14.5 | −16.2 | −17.8 | −13.7 | −14.0 | −12.2 |
| | p | −16.6 | −16.0 | −14.9 | −9.6 | −10.5 | −8.6 | −14.2 | −13.8 | −11.9 | −14.4 | −13.2 | −15.5 | −11.1 | −11.6 | −10.6 |

Meanings:
n—stress parallel to bottom edge
p—stress perpendicular to bottom edge
cl = clear glass
gr = green glass A number of tests were performed to assess the performance of soldered connections to electrical circuits on thin glass subjected to Pilkington's Advanced Press Bending process.

For many years, a standard thermal cycling test has been used to evaluate the performance of soldered connections on vehicle glazings. Experience indicates that products showing a failure rate of up to 30% in this test give acceptable performance in service.

Silver ink patches were printed manually on to samples for asymmetric production windscreens (2.1 mm/1.6 mm). For some samples printing was done directly on the glass and on others, printing was done on the black printed area for soldering contacts.

After the standard furnace process and lamination three different type of connectors for heater applications were applied—braid, stranded wire and stranded wire with a flattened wire end sleeve.

Soldered samples were then aged in a thermal cycling test acc. DBL 5610 with increased speed for temperature change (16 h @−40° C.; 60 min slope up; 8 h@+80° C.; 90 min slope down) and inspected again after test.

Finally pull off tests were done on all connectors.

180 connectors on silver and 180 connectors on silver/black were evaluated. The results are shown in tables 2a and 2b.

TABLE 2a

Test results for Standard Soldering on Silver Patches on 1.6 mm APBL Glass.

| Windscreen No | Connector | Fracture failure After thermal cycle (%) | Mean value of 12 connectors Pull Off Forces [N] |
|---|---|---|---|
| 1 | Wire | 8 | 102 |
| 2 | Wire | 33 | 77 |
| 3 | Wire | 50 | 59 |
| 4 | Wire | 17 | 64 |
| 5 | Wire | 17 | 56 |
| 1 | Wire-Plate | 8 | 148 |
| 2 | Wire-Plate | 8 | 143 |
| 3 | Wire-Plate | 0 | 133 |
| 4 | Wire-Plate | 0 | 116 |
| 5 | Wire-Plate | 0 | 131 |
| 1 | Braid | 25 | 119 |
| 2 | Braid | 17 | 104 |
| 3 | Braid | 17 | 97 |
| 4 | Braid | 17 | 80 |
| 5 | Braid | 8 | 92 |

TABLE 2b

Test results for Standard Soldering on Silver Patches over Blackprint on 1.6 mm APBL Glass.

| Windscreen No | Connector | Fracture failure After thermal cycle (%) | Mean value of 12 connectors Pull Off Forces [N] |
|---|---|---|---|
| 1 | Wire | 100 | Pull off forces not tested |
| 2 | Wire | 100 | Pull off forces not tested |
| 3 | Wire | 100 | Pull off forces not tested |
| 4 | Wire | 100 | Pull off forces not tested |
| 5 | Wire | 100 | Pull off forces not tested |
| 1 | Wire-Plate | 8 | Pull off forces not tested |
| 2 | Wire-Plate | 42 | Pull off forces not tested |
| 3 | Wire-Plate | 67 | Pull off forces not tested |
| 4 | Wire-Plate | 58 | Pull off forces not tested |
| 5 | Wire-Plate | 50 | Pull off forces not tested |
| 1 | Braid | 100 | Pull off forces not tested |
| 2 | Braid | 100 | Pull off forces not tested |
| 3 | Braid | 100 | Pull off forces not tested |
| 4 | Braid | 100 | Pull off forces not tested |
| 5 | Braid | 92 | Pull off forces not tested |

Referring to tables 2a and 2b, twelve samples for each of three connector types on each of five windscreens were tested both on silver on glass patches (table 2a) and on silver over black print (table 2b). Inspection for fracture failure was done on each sample immediately after soldering and in no case was any observed. Inspection was repeated after thermal cycling tests and results are shown. The result shows clearly that soldering on silver/black has a very high crack rate after thermal cycling with most connectors failing the test. For that reason, no further pull off tests were performed on these samples.

However, the results obtained from silver conductive ink printed directly on glass were very different: no failure after soldering was seen and only 15% failure was noted after thermal cycling. For the stranded wire with flattened wire end sleeve the failure rate was even lower (only 2 failures or 3% on 60 tested connectors).

Moreover, the ink directly on glass samples performed well in the pull off test. A mean value of 134N for the stranded wire with flattened sleeve gives good confidence for the performance against a minimum required pull off force of 40N. The pull-off failure mode in each case was silver/glass.

Figure 2:
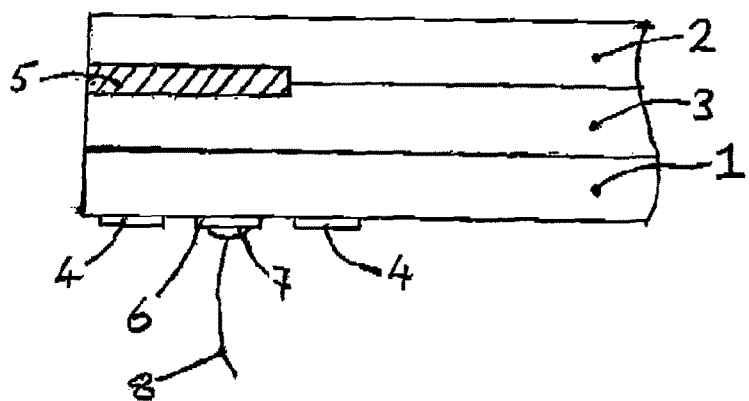
FIG. 2 illustrates a typical laminated glazing assembly according to the invention and FIG. 3 shows the positions of soldered connections that were arranged on glazing laminates according to the invention for subsequent evaluation.

Referring to FIG. 2, a laminated glazing according to the invention comprises inner and outer glass sheets 1 and 2 respectively having a thickness of less than 2.1 mm. Inner sheet has a surface stress of greater than 8 MPa but less than 25 MPa.

An interlayer 3 of polymer material such as PVB is disposed between the glass sheets 1 and 2 an obscuration bands is provided by printed ceramic ink layers 4, 5 on the inner surfaces of sheets 1 and 2. Ink layers 4, 5 are formed by screen printing and subsequent firing in a process that is well known to a person skilled in the art and needs no further explanation here.

In order to facilitate printing of an electrical conductor 6 in conductive ink such as silver based ink directly on to the inner surface of glass sheet 1, ink layer 4 includes a gap where the substrate glass sheet 1 is exposed. Such a gap is easily realised in the screen printing process.

Electrical conductor 6 may then be printed directly on sheet 1 thus facilitating a more reliable solder connection 7 to a second conductor 8 as explained previously. Electrical conductor 6 could be, for example, a wiper rest area heating element or a busbar and remains hidden from view to a person outside of the vehicle by virtue of layer 5. Conductor 8 typically leads to other equipment such as a power supply or radio receiver.

As previously noted, existing technology allows for differential heating of one or both dies in the apparatus used for press bending. In a preferred embodiment of the invention, such facilities are used to induce greater local surface stress in a region of the glass sheet where soldering is done.

Figure 3:
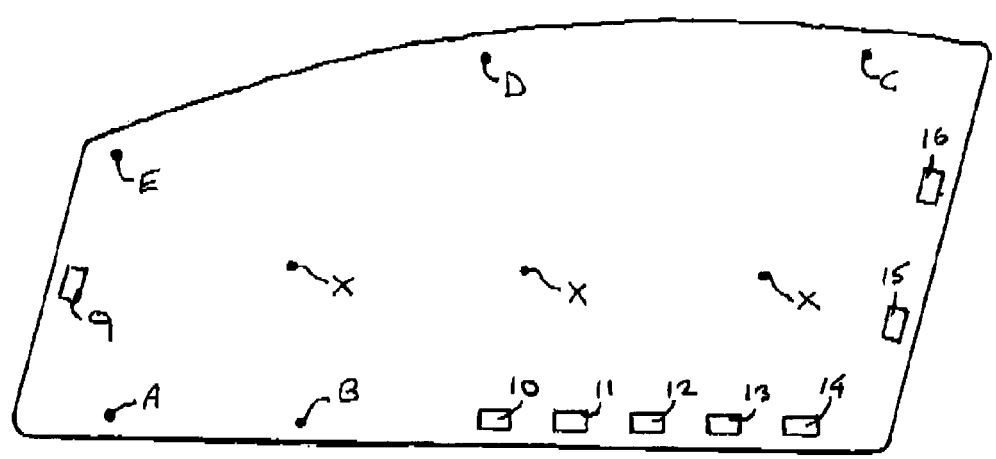

Referring to FIG. 3, a further set of 12 laminated glass samples were prepared from glass sheets that were subjected to Pilkington's APBL process and a polyvinyl butyral interlayer. A black ceramic ink (obscuration band) and silver ink layer was applied and test solder connections were made at each of positions 9-16 (T-piece connectors) and A-E (radio button connectors).

The samples were then aged in a thermal cycling test acc. DBL 5610 with increased speed for temperature change (16 h@−40° C.; 60 min slope up; 8 h@+80° C.; 90 min slope down). Inspection before and after test showed no cracking.

The samples were then subjected to humidity testing which involved exposure to 95% humidity at 50° C. for over 240 hours before pull off forces were ascertained.

Table 3 indicates the results of this procedure. Two target surface stress levels, namely 20 MPa and 35 MPa, were chosen for the samples. The actual surface stress levels were measured at points approximately indicated by X in FIG. 3 and ranged from 18-22 MPa and 33-37 MPa.

Mean pull off forces were determined and are shown in the table (maximum force applied was 200N).

TABLE 3

Test results for Standard Soldering on Silver Print over Blackprint on laminates formed from APBL Glass.

| No. | Thickness | Silver-Ink | Black-Ink | Stress Level | Mean Pull off force (1-8) | Mean ull off force (A-E) | Failure-Mode |
|---|---|---|---|---|---|---|---|
| 1 | 1.6/1.6 mm | 1903 | F-14510IR | 20 | 126 | 200 | glass |
| 2 | 1.6/1.6 mm | 1903 | F-14510IR | 35 | 111 | 200 | glass |
| 3 | 1.6/1.6 mm | 1903 | JM-1730IR | 20 | 97 | 198 | glass |
| 4 | 1.6/1.6 mm | 1903 | JM-1730IR | 35 | 136 | 200 | glass |
| 5 | 1.8/1.8 mm | 1903 | F-14510IR | 20 | 116 | 200 | glass |
| 6 | 1.8/1.8 mm | 1903 | F-14510IR | 35 | 180 | 195 | glass |
| 7 | 1.8/1.8 mm | 1903 | JM-1730IR | 20 | 104 | 189 | glass |
| 8 | 1.8/1.8 mm | 1903 | JM-1730IR | 35 | 153 | 200 | glass |
| 9 | 2.1/2.1 mm | 1903 | F-14510IR | 20 | 178 | 185 | glass |
| 10 | 2.1/2.1 mm | 1903 | F-14510IR | 35 | 124 | 200 | glass |
| 11 | 2.1/2.1 mm | 1903 | JM-1730IR | 20 | 189 | 174 | glass |
| 12 | 2.1/2.1 mm | 1903 | JM-1730IR | 35 | 193 | 189 | glass |

The samples were examined for cracking after the humidity testing and none was detected.

The invention claimed is:

1. A laminated glazing comprising:
   a first glass sheet having a thickness of less than 2.1 mm and a center part;
   a first electrical conductor formed as a layer of conductive metallic ink printed on said first glass sheet;
   a second electrical conductor connected to said first electrical conductor by a soldered connection at a soldering region of the first glass sheet, said soldering region of the first glass sheet being closer than the center part of the first glass sheet to an edge of the first glass sheet, said soldering region having a surface stress that is locally increased, prior to soldering of the soldered connection, to be higher than a surface stress in the center part;
   a second glass sheet; and
   a polymer interlayer disposed between the first and second glass sheets, the first glass sheet and the second glass sheet being bonded together by said interlayer;
   wherein an opaque coating applied around a periphery of said first glass sheet, said coating applied around the periphery of said first glass sheet including a gap between portions of the opaque coating where the surface of the first glass sheet is not applied with the opaque coating and where said first electrical conductor is printed, the opaque coating being out of contact with the first electrical conductor;
   wherein a second opaque coating placed between the polymer interlayer and the second glass sheet overlapping the first electrical conductor placed within the gap.

2. The laminated glazing according to claim 1, where the first glass sheet has a surface stress between 8 MPa and 25 MPa.

3. The laminated glazing according to claim 2, where the first glass sheet has a surface stress between 8 MPa and 20 MPa.

4. The laminated glazing according to claim 3, where the first glass sheet has a surface stress between 8 MPa and 15 MPa.

5. The laminated glazing according to claim 1, where the first glass sheet has a thickness of less than or equal to 1.6 mm.

6. The laminated glazing according to claim 5, where the first glass sheet has a thickness of less than or equal to 1 mm.

7. The laminated glazing according to claim 1, wherein the first electrical conductor is disposed between the first glass sheet and the second electrical conductor.

8. The laminated glazing according to claim 1, wherein the conductive metallic ink is a silver ink.

* * * * *